June 7, 1966  W. J. FRANK, JR  3,255,302
MOLDED INSULATION CASING
Filed Jan. 19, 1965

INVENTOR.
WALTER J. FRANK JR.
BY Howard A. Reiter
ATTORNEY

3,255,302
MOLDED INSULATION CASING
Walter J. Frank, Jr., Darien, Conn., assignor to Burndy Corporation, a corporation of New York
Filed Jan. 19, 1965, Ser. No. 426,579
2 Claims. (Cl. 174—138)

This invention relates to an insulating housing for an electrical connection. The electrical connection may comprise a cable splice, or a multiple connection having one or more branches.

Among the objects of the invention are to provide an insulating housing that can be simply and expeditiously formed about an electrical connection, that is relatively inexpensive, that may be permanent, and that seals the connection against corrosion and moisture. Other objects are to provide a housing that is formed within a mold cover accommodating a wide range of cable sizes and into which a hardening insulating material may be poured to seal the connection; to provide novel resilient plugs that may be positioned in the conductor openings of the mold cover for holding the liquid insulating material within the form until it has hardened into the desired shape; to provide resilient sealing means along the longitudinal and transverse seams of the mold cover to seal the closing edges of a cover about the connection in order to complete the mold enclosure for pouring; and to provide a range-taking, thin plastic mold cover for shaping the hardenable insulating material.

These and other objects and advantages of this invention will be made more apparent by reference to the following specification and claims taken in conjunction with the accompanying drawings, in which:

Figure 1:
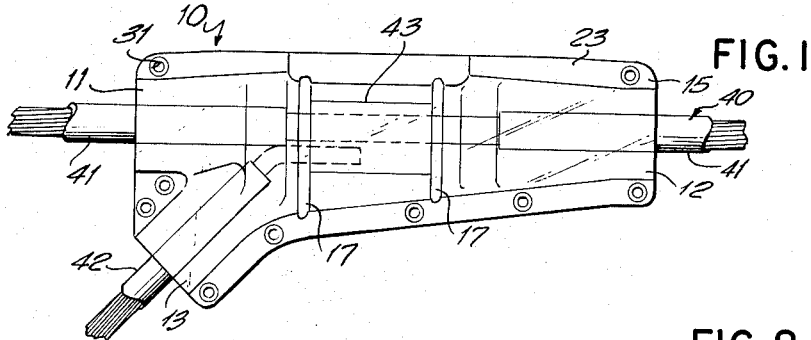
FIG. 1 is a side elevation of two mold cover halves assembled about an electrical tap connection.

Generally the invention comprises a sheet-like mold cover with its edges fitted together over strips and collars of resilient cushioning material which adjustably fits the conductors, and seals the mold so that a liquid insulation material can be poured into the mold cover and hardened into an effective moisture and corrosion-free sealed connection housing.

Referring to the drawings with greater particularity, reference numeral 10 designates generally a pair of shape-retaining sheet-like mold cover halves, employing fasteners 30 which are positioned in apertures 31 of the cover for locking the two halves together about the cable tap connection 40.

Figure 2:
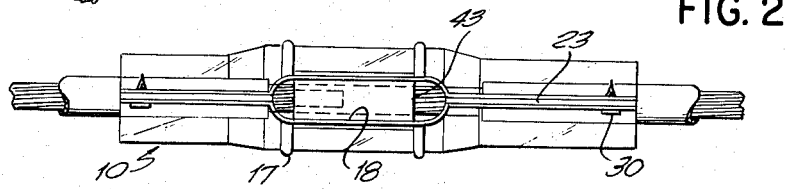
FIG. 2 is a top plan view of the same.
Figure 3:
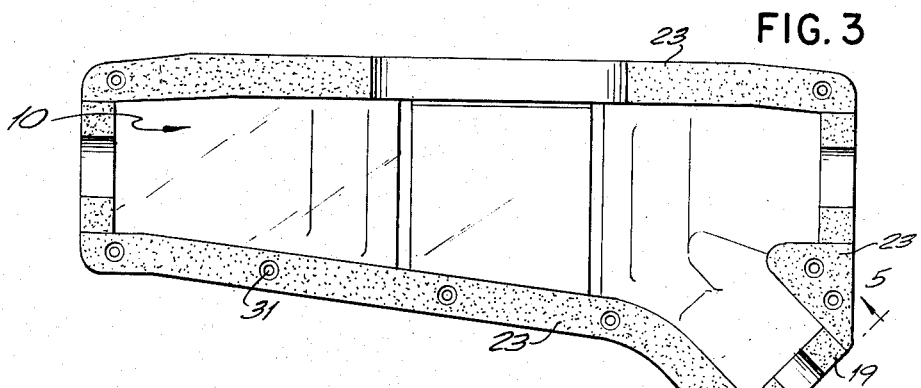
FIG. 3 is a rear elevation of a cover half.
Figure 4:
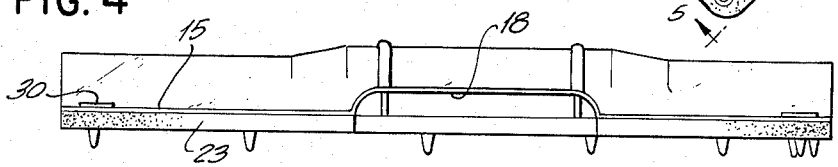
FIG. 4 is a top plan view of the same.
Figures 5, 6:
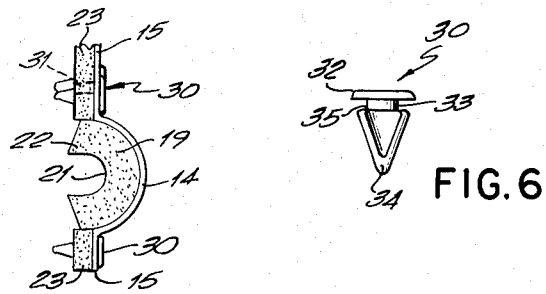
FIG. 5 is an end view of a cable opening of the cover half of FIG. 3, taken in the plane 5—5 as seen in the direction of the arrow.
FIG. 6 is a side elevation of a fastener which may be used to hold the cover halves together to form the mold.

The cover half 10, shown in FIGS. 1 and 2, is provided with outlet openings 11, 12 and 13, through which extends the cable 41, and the tap conductor 42, respectively; the two cables being electrically joined by connector 43. As is shown in FIG. 5, the cover half 10 comprises an outwardly curved body 14 and outwardly extending marginal flanges 15 into which the fastener apertures 31 are formed. Beads 17 may be formed into the wall of the semi-tubular body 14 to stiffen the wall against collapse and to provide tactile positioning points for the connector 43. A pouring opening 18 may be formed in the tap flange 15, to facilitate filling the completed mold.

For each of the connector openings a pair of semi-cylindrical sections 19, of a resilient plug material, having openings 21 are positioned as end cushioning seals. These will resiliently form about the conductor insulation and effectively seal the openings against leakage of the insulation material prior to solidification. The plugs are formed with contacting tips 22 to achieve tighter compression about the conductors for more effective sealing.

Similarly strips 23 of cushioning seal material may be positioned longitudinally and transversely between the flanges to complete the cover mold seal, retaining only the opening 18 for filling the mold cover form with the insulation material.

The illustrated fasteners 30 are adequate for securing the two cover halves together about the connector 43 with the conductors 41 and 42 extending through the outlets, and with the cushioning material sealing the seams and openings. The snap-type fasteners comprise a head 32, a shank portion 33, and a spear point portion 34 for facilitating entry of the fastener into the cover flange aperture 31. The shoulder 35 of the spear point is engaged by the flange walls of the cover when the fastener is pushed through the apertures 31 to secure the two cover halves together.

When assembled, a hardenable insulating compound is poured through the opening into the joined forms 18 until the insulation reaches the top of the flange opening. When this entire housing is filled and the insulation hardened, the insulated connection is completed.

I have found that the mold covers can be made of $\frac{1}{16}''$ thickness plastic sheeting such as transparent cellulose acetate butyrate, vacuum molded into suitable shape. The transparency of this material greatly facilitates visual inspection of proper mold filling. The resilient plugs may be made of vinyl foam. The sealing strips may be made of a less dense material such as polyurethane foam formed with intercommunicating cells to allow the air to pass therethrough but small enough to retain the liquid plastic insulating material by surface tension. The strips may be about 1" wide to match the marginal flanges and $\frac{1}{4}''$ thick. Suitable adhesives may be used for attaching the plastic strips and plugs to the cover mold flanges and body.

The insulation material used for filling the mold covers to form the sealed connection may be one of the well known epoxy types used with a suitable activator to harden the liquid material within a matter of minutes. The fasteners 30 too may be made of a suitable plastic material, nylon being suitable for this purpose.

The resulting mold covers permit a simple and quick assembly about a range of differently sized electrical connections for forming an insulation covering and seal therefor. The resilient plugs and strips of different densities provide adjustable collars for a range of conductor sizes and resilient seal means for holding the liquid plastic in position regardless of the size of the conductors while easing pouring problems caused by air entrapment. The pointed plugs provide a tight compression nearest the conductors, for a better seal.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

I claim:
1. A shape-retaining, separable mold for molding and enclosing insulation about an electrical connection, comprising: a pair of mold half-sections, each having edge flanges, said half-sections being coupled together along said flanges to define a substantially hollow mold cavity; first passages through the said edge flanges of each half-section forming an opening for emergence of conductors from within said cavity; second passages through the said edge flanges of each half-section forming an opening for introduction of fluid insulating material into said cavity; resilient cushioning material, of a type substantially impervious to fluid insulating material, disposed along said edge flanges between said half-sections; means securing said half-sections together against said cushioning material; and resilient cushioning material lining said first passages, in position to encircle and engage a conductor emerging from within said cavity; the resilient cushioning material within the first passages of each half-section being provided with oppositely positioned pointed portions for producing maximum compression of said cushioning material proximate the surface of an encircled conductor.

2. The shape-retaining mold of claim 1 wherein said means securing said half-sections together comprises an aperture extending through the edge flange of one of said half-sections; an aperture extending through the edge flange of the other of said half-sections; and a pointed fastener extending through both of said apertures; said fastener having a head portion incapable of passing through the apertures in said edge flanges, and a retaining shoulder adapted to snap through said apertures, said fastener engaging said flanges between said head portion and said shoulder.

References Cited by the Examiner

UNITED STATES PATENTS

| | | | |
|---|---|---|---|
| 1,670,331 | 5/1928 | Wunderlich | 249—166 X |
| 2,734,227 | 2/1956 | Costick et al. | 18—42 X |
| 2,908,744 | 10/1959 | Bollmeier | 174—92 X |
| 3,138,657 | 6/1964 | Wengen | 174—5 X |
| 3,151,905 | 10/1964 | Reuther et al. | 285—45 X |

FOREIGN PATENTS

| | | |
|---|---|---|
| 150,250 | 2/1953 | Australia. |
| 218,991 | 11/1958 | Australia. |
| 1,118,648 | 3/1956 | France. |

ROBERT K. SCHAEFER, *Primary Examiner.*

LARAMIE E. ASKIN, *Examiner.*